(12) United States Patent
Chung

(10) Patent No.: US 8,108,276 B2
(45) Date of Patent: Jan. 31, 2012

(54) METHOD AND APPARATUS FOR REFERENCE DATA SCRUBBING

(75) Inventor: Chul Chung, Hong Kong (HK)

(73) Assignee: Goldman Sachs & Co., New York, NY (US)

( * ) Notice: Subject to any disclaimer, the term of this patent is extended or adjusted under 35 U.S.C. 154(b) by 1687 days.

(21) Appl. No.: 10/608,673

(22) Filed: Jun. 27, 2003

(65) Prior Publication Data

US 2004/0039972 A1  Feb. 26, 2004

Related U.S. Application Data

(60) Provisional application No. 60/392,519, filed on Jun. 28, 2002.

(51) Int. Cl.
*G06Q 40/00* (2006.01)
(52) U.S. Cl. ............................................. 705/35; 705/37
(58) Field of Classification Search .................... 705/35, 705/37
See application file for complete search history.

(56) References Cited

U.S. PATENT DOCUMENTS

| | | | |
|---|---|---|---|
| 3,212,062 A * | 10/1965 | Katz et al. ..................... | 340/5.82 |
| 5,890,140 A * | 3/1999 | Clark et al. ..................... | 705/35 |
| 5,963,923 A | 10/1999 | Garber | |
| 6,317,727 B1 | 11/2001 | May | |
| 6,360,210 B1 | 3/2002 | Wallman | |

OTHER PUBLICATIONS

"PCT Notification of Transmittal of the International Search Report or the Declaration", dated Apr. 22, 2004 for PCT/US03/20501, 5pgs.
Allen & Overy, Memorandum for ISDA Members: "Definition of "Fully Transferable Obligation" in the ISDA Restructuring Supplement", Nov. 27, 2001. 4pgs.
Allen & Overy, "An Introduction to the Documentation of OTC Derivatives: Ten Themes", May 2002. 7pgs.
"Sample form of Credit Derivative Confirmation", 10pgs.
Skora, Richard K., Article: "The Credit Default Swap", Skora & Company, Inc., Risk Publications, 1998. 8pgs.
"Restructuring Supplement to the 1999 ISDA Credit Derivatives Definitions", 4pgs.
"Commentary on Restructuring Supplement", 5pgs.
Insurance Journal, "Swiss Re Sues XL Over Armstrong Credit Swap", May 23, 2001, download from http://www.insurancejournal.com/news/newswire/international/2001/05/23/12939.html/print on Sep. 25, 2003. 1pg.
Allen & Overy, "An Introduction to the Documentation of OTC Derivatives", May 2002. 12pgs.
ISDA, "Background Information—OTC Derivatives Documentation: Improving Counterparty Risk Management Practices", Jun. 1999, 66pgs.

* cited by examiner

*Primary Examiner* — Mary Cheung
*Assistant Examiner* — Daniel L Greene
(74) *Attorney, Agent, or Firm* — Chadbourne & Parke, LLP; John A. Squires

(57) ABSTRACT

A system, medium storing processor-executable process steps, and method for supporting a derivative transaction, the method including receiving data identifying a reference entity participating in the derivative transaction; receiving data identifying at least a first reference obligation associated with the derivative transaction; identifying a contractual relationship between the reference entity and the at least first reference obligation; and generating a data record associated with the derivative transaction, the data record including the data identifying said reference entity, the data identifying the at least first reference obligation, and data identifying said contractual relationship, wherein the data record is verified as accurate as of an issue date of the derivative transaction.

13 Claims, 7 Drawing Sheets

METHOD AND APPARATUS FOR REFERENCE DATA SCRUBBING

CROSS-REFERENCE TO RELATED APPLICATIONS

This application claims priority to, and hereby incorporates by reference for all purposes, U.S. Provisional Application Ser. No. 60/392,519, filed on Jun. 28, 2002 for "METHOD AND APPARATUS FOR REFERENCE DATA SCRUBBING".

FIELD OF THE INVENTION

The present invention relates to systems, methods, apparatus, computer program code and means for supporting transactions. More particularly, embodiments of the present invention relate to systems, methods, apparatus, computer program code and means for supporting transactions such as derivative transactions.

BACKGROUND

Credit derivatives are financial vehicles which were developed in the 1990's as a means for transferring the risk of the total return in a credit transaction falling below a stipulated rate, without transferring the underlying asset. More particularly, a credit derivative is a financial arrangement which allows one party to transfer credit risk of a particular asset (which it may or may not own) to one or more other parties.

An example transaction is shown in FIG. 1, where a protection buyer 10 (also referred to as an originator) has contracted with a protection seller 14 to transfer credit risk of a reference asset 12. Protection buyer 10 need not own reference asset 12, instead, protection buyer 10 need only have credit risk associated with its interest in reference asset 12. The transaction involves the payment of a negotiated fee from protection buyer 10 to protection seller 14. In exchange, protection buyer 10 receives a contingent payment which occurs in the event of the occurrence of a predefined event. Typically, the contingent payment is payable upon the occurrence of a "credit event" (such as, for example, bankruptcy, insolvency, receivership, material adverse structuring of debt, failure to meet obligations when due, etc.) associated with a specified "reference obligation" of a reference entity.

Standard form International Swaps and Derivatives Association (ISDA) Credit Events used for such credit derivative agreements assume that the reference entity is, or will be, contractually obligated to a reference obligation. This is not necessarily the case, however.

Because the obligation to pay the contingent payment is based on contractual relationships among various parties, it is important to accurately understand (on an ongoing basis) the current status of the parties and the reference obligations. Examples of the difficulty of maintaining an accurate understanding of the status are, unfortunately, becoming too common. For example, in 2001, Swiss Re Financial Products Corp. sued XL Insurance Ltd. over its refusal to pay a $20 million claim made by Swiss Re in connection with the bankruptcy of Armstrong World Industries. The suit was based on the language of a credit swap agreement. XL maintained that it issued a credit insurance policy covering the debts of Armstrong Holdings, not Armstrong World Industries, and therefore refused to pay the claim. In particular, XL maintained that a credit event occurred as a result of the bankruptcy of Armstrong World Industries, and that the credit event did not extend to Armstrong Holdings. Put simply, Swiss RE (and others) suffered losses because the confirmation documents associated with the credit agreements referred to "Armstrong Holdings Inc." rather than "Armstrong World Industries", even though (in some cases) the reference obligation details were those of Armstrong World Industries bonds.

Other issues are associated with the accuracy of such credit risk agreements. For example, ISDA Credit Events, if interpreted literally, cannot be triggered if the reference entity has no material indebtedness. Accordingly, it would be desirable to provide systems and methods to ensure that such agreements are based on accurate characterizations of reference entities and reference obligations. It would further be desirable to provide systems and methods for updating information identifying reference entities and obligations throughout the life of an agreement.

DETAILED DESCRIPTION OF THE INVENTION

Figure 1:
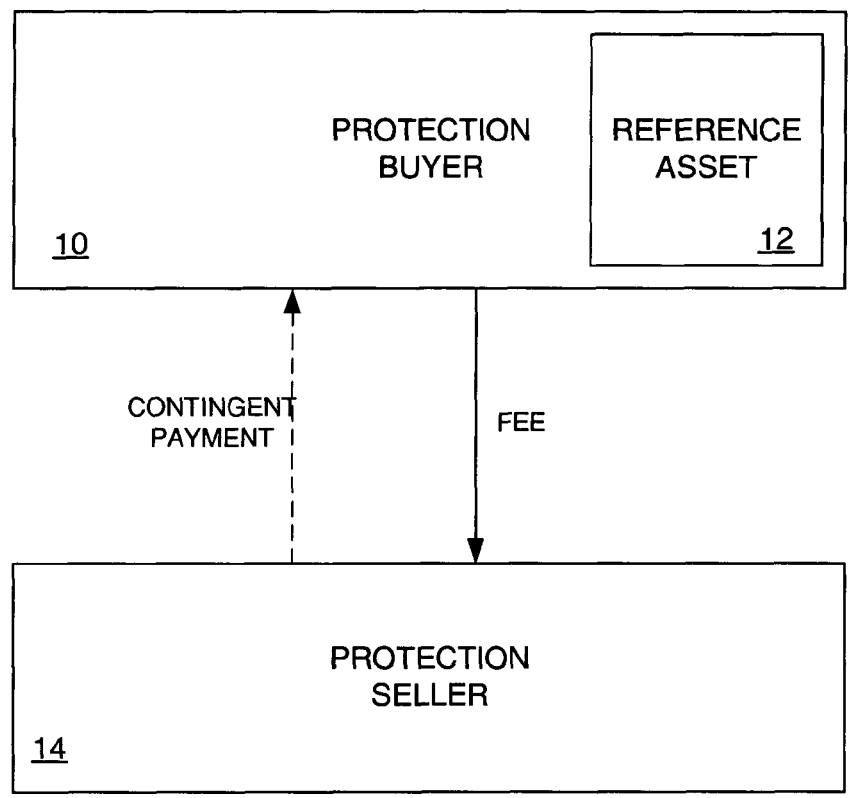
FIG. 1 is a block diagram of an exemplary derivative transaction which may be supported using techniques of embodiments of the present invention.

Applicant has recognized that there is a need for an improved system, method, apparatus, computer program code, and means for updating, monitoring, and maintaining reference data used in support of transactions such as derivative transactions (and further in support of clearing, matching, and straight through processing systems associated with such transactions). In particular, Applicant has recognized that there is a need for an improved system, method, apparatus, computer program code, and means for efficiently ensuring that reference entity and reference obligation data utilized in transactions such as derivative transactions is accurate and current. Embodiments of the present invention provide a technical solution to deficiencies of previous systems. For example, a reference data system is provided which allows the capture and entry of reference entity and reference obligation data from a wide variety of sources in an efficient and accurate manner. In some embodiments, by providing a networked system which allows users to interact with a reference data system, reference data can be provided, scrubbed, and maintained for derivative agreements which involve different jurisdictions, different entities, and different users. Other technical aspects of embodiments will be discussed below.

A number of terms are used herein to describe features of embodiments of the present invention. For example, as used herein, the term "reference entity" is used to refer to an entity (usually a corporation, but sometimes a sovereign or other institution) that has either issued or guaranteed a security or an obligation (referred to herein as a "reference obligation"). These reference obligations are typically issuances of debt obligations (such as notes or bonds), but they can also involve non-debt securities (such as preference shares or the like). Reference obligations may also be associated with structured notes, structured bonds, loans, and other obligations. As used herein, the term "schedule" is used to refer to a document listing one or more reference entities and providing details of single reference obligations that each reference entity has issued or guaranteed.

An example schedule will be described further below. The schedule may be in electronic form (e.g., formatted as a spreadsheet, word processor document, database, or the like). As used herein, the term "offering document" is used to refer to documents describing terms of a particular reference obligation generally produced by, or on behalf of, the entity offering a particular reference obligation. The offering document may also be referred to as an "obligation document". Offering documents may be provided in various forms, such as, for example as a prospectus, or an offering circular or offering memorandum which may be supplemented by a prospectus supplement, a pricing supplement, or both. As will be described further below, offering documents may be provided in electronic or paper form.

Pursuant to some embodiments of the present invention, systems, methods, apparatus, computer program code, and means for updating, monitoring, and maintaining reference data include the use of a reference data system in communication with one or more user devices which are operated by individuals or entities to: (1) input and scrub reference obligation data; (2) input and scrub reference entity data; (3) link reference obligation data with reference entity data; (4) input, update, and maintain reference obligation and reference entity data in a reference data database; and/or (5) utilize data from the reference data database to support derivative transactions such as credit derivative transactions. In this manner, transactions are provided which are based on accurate and timely information, ensuring that derivative transactions and their associated obligations may be enforced. Embodiments of the present invention help ensure that legal entities, obligations, and contractual relationships which establish credit risk agreements are accurate at the time the agreement is formed and during the life of the agreement.

Figure 2:
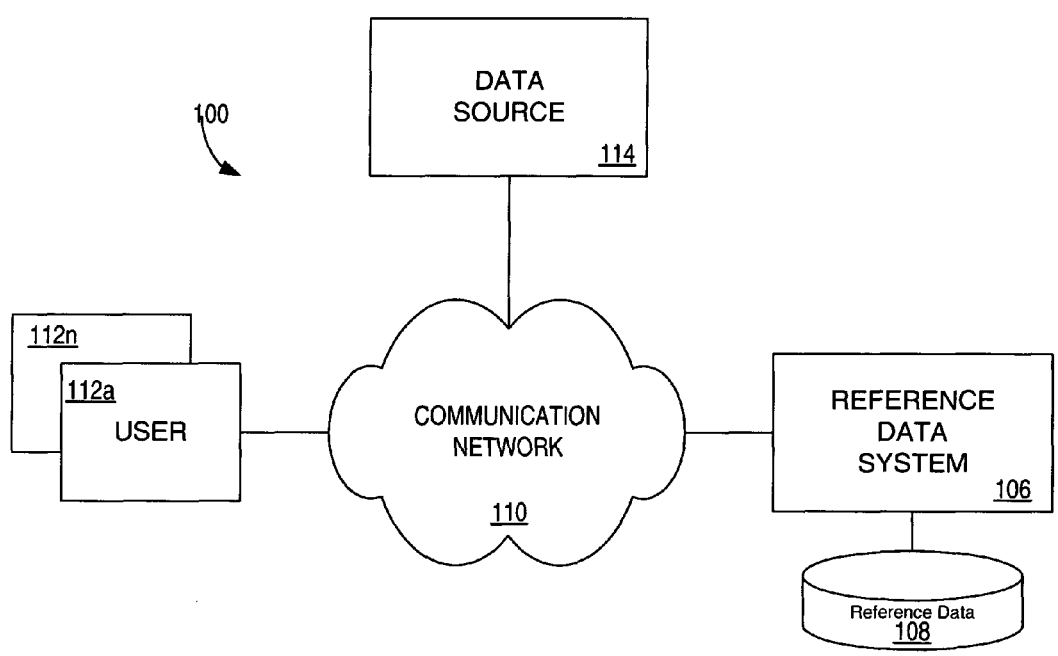
FIG. 2 is a block diagram of an exemplary system pursuant to some embodiments of the present invention.

Referring now to FIG. 2, an exemplary system 100 is shown which may be used to receive, update, and monitor reference data pursuant to embodiments of the present invention. As depicted, system 100 includes a number of user devices 112*a-n* in communication with one or more reference data systems 106 via a communication network 110. The devices are also in communication with one or more data sources 114 through communication network 110.

Each user device 112*a-n* may be, for example, a computing device such as a personal computer (PC) configured to perform the functions described herein. Each user device 112*a-n* may be associated with an individual or entity authorized to interact with reference data system 106. For example, a user device 112 may be operated by an individual responsible for updating and maintaining reference data stored at a reference data database 108. As another example, a user device 112 may be operated by a trader or trade administrator in the establishment of a credit derivative transaction.

Reference data system 106 may also be a computing device (such as a PC) configured to perform the functions described herein. Although only a single reference data system 106 is depicted, those skilled in the art will appreciate that any number of reference data systems may be provided (e.g., to receive, update, and monitor reference data associated with different types of reference data or on behalf of different users). Those skilled in the art will also appreciate that reference data system 106 may be formed of one or more computing devices configured to cooperatively act to provide the functionality described herein.

Data source 114 may also be a computing device configured to provide data to other devices of the system. In some embodiments, data source 114 may be a data repository operated to catalog, store, or otherwise maintain information about reference entities and reference obligations. For example, in one embodiment, data source 114 may be a database of credit agreement or offering prospectuses maintained by an entity such as "Europrospectus.com Ltd". As another example, data source 114 may be information collected by a government or regulatory authority such as the EDGAR (Electronic Data-Gathering, Analysis, and Retrieval) database associated with the U.S. Securities and Exchange Commission. Other sources of data may also be in communication with system 100 to provide up-to-date and accurate information to reference data system 106. Although only a single data source 114 is shown in FIG. 2, any number of data sources may be provided.

Some or all of the computing devices described herein may also comprise a portable computing device such as a laptop computer, a Personal Digital Assistant (PDA), a wired or wireless telephone, any other appropriate storage and/or communication device, or network of devices.

According to some embodiments, reference data system 106 may be, for example, a Web server adapted to exchange information with user devices 112 and to receive information and data via communication network 110. Communication network 110 may be, for example, an Internet Protocol (IP) network (e.g., the Internet). Note that the communication network 110 can also include a number of different networks, such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, reference data system 106 communicates with user devices 112 via a temporary computer communication channel (e.g., a path through which information can be exchanged). In other words, the communication channel between reference data system 106 and a particular user device 112 may be established and discontinued as appropriate. Note that an established communication channel does not need to be associated with a particular physical path. For example, reference data system 106 may exchange information with a user device 112 via a Web site, in which case packets of information may be transmitted via various physical paths.

According to other embodiments, reference data system 106 communicates with user devices 112 via a public computer communication network. That is, at least a portion of the communication network may be accessed by devices other than system 106 and user devices 112. Note, however, that the information exchanged between reference data system 106 and user devices 112 could be encrypted or otherwise protected to prevent a third party from accessing (i.e., understanding) the information.

Reference data system 106 is in communication with one or more data stores such as reference data database 108. As will be described further below, reference data database 108 includes reference data associated with different credit derivative agreements. For example, database 108 includes data associated with a number of different reference entities and data associated with a number of different reference obligations. Database 108 may be any database or device configured to store and allow retrieval of the data described herein. For example, in one embodiment, database 108 is configured using Microsoft Access®, a relational database management program by Microsoft® or other structured database system.

Pursuant to some embodiments of the present invention, the data stored in database 108 is verified, updated and screened (or "scrubbed") for accuracy when it is initially entered into database 108, and it is verified, updated and screened for accuracy on an on-going basis after it has been entered into database 108. As a result, parties to derivative transactions are provided with greater confidence of the accuracy of information associated with particular transactions. Further details of this initial entry and maintenance of data will be provided further below.

Figure 3:
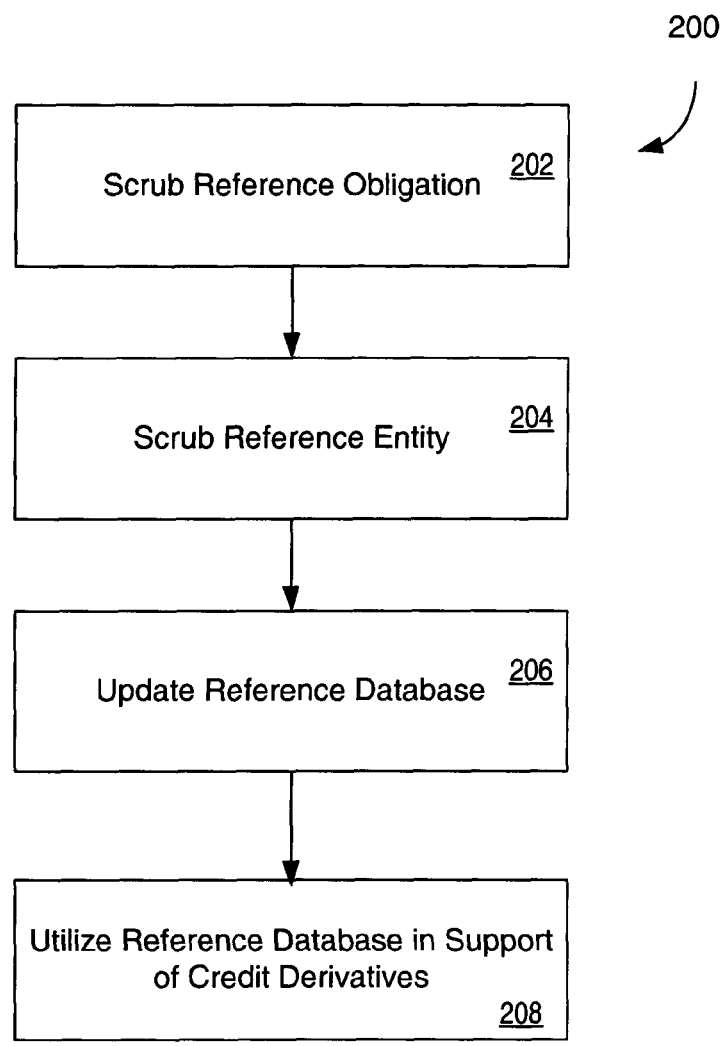
FIG. 3 is a flow diagram of an exemplary reference data scrubbing process pursuant to some embodiments of the present invention.

Referring now to FIG. 3, an exemplary reference data scrubbing process 200 is shown which may be performed using the system 100 of FIG. 2. Further details of process 200 will be provided below, however, as a brief introduction, process 200 generally includes receiving a request to scrub information associated with an agreement (e.g., a request may be submitted to reference data system 106 from a trading entity operating a user device 112). The information is scrubbed by confirming the reference obligation information; confirming the reference entity information; linking the reference entity information to the reference obligation information; and updating a reference entity database with the scrubbed information. In some embodiments, this may further include assigning an identifier to the scrubbed reference entity/reference obligation pair, allowing the information to be easily identified. Further details of process 200 will now be provided.

Process 200 begins at 202 where reference obligation data is scrubbed. This processing may involve, for example, interaction between a user operating user device 112 and reference data system 106. For example, a user operating user device 112 may identify and enter reference obligation data which is associated with a particular credit derivative transaction. Processing at 202 may be performed prior to execution of a credit derivative transaction or contemporaneously therewith. In some embodiments, processing at 202 is performed prior to identification of a particular credit derivative transaction to establish a "scrubbed" database of reference obligations that can be used to support future credit derivative transactions.

Processing at 202 includes, for example, the identification and delivery of supporting materials which are used to scrub reference obligation data. These supporting materials, in some embodiments, include: (1) a schedule containing reference entity names and obligations associated with each reference entity name (e.g., such as coupon amounts and maturity dates, etc.); and (2) offering documents (e.g., such as a prospectus, offering circular, offering memorandum, and any supplements thereto). Any or all of these supporting documents may be provided in electronic form. For example, in some embodiments, the schedule is provided in spreadsheet form (e.g., submitted to reference data system 106 via an electronic mail message or the like). The offering documents may also be provided in electronic form (e.g., as image files, text files, or the like). Upon receipt of supporting materials, in some embodiments, processing at 202 includes generating a database record associated with each schedule (e.g., one record per obligation associated with a particular reference entity). In some embodiments, each database record is assigned a unique record identifier, allowing the data to be separately tracked and identified.

Figure 4:
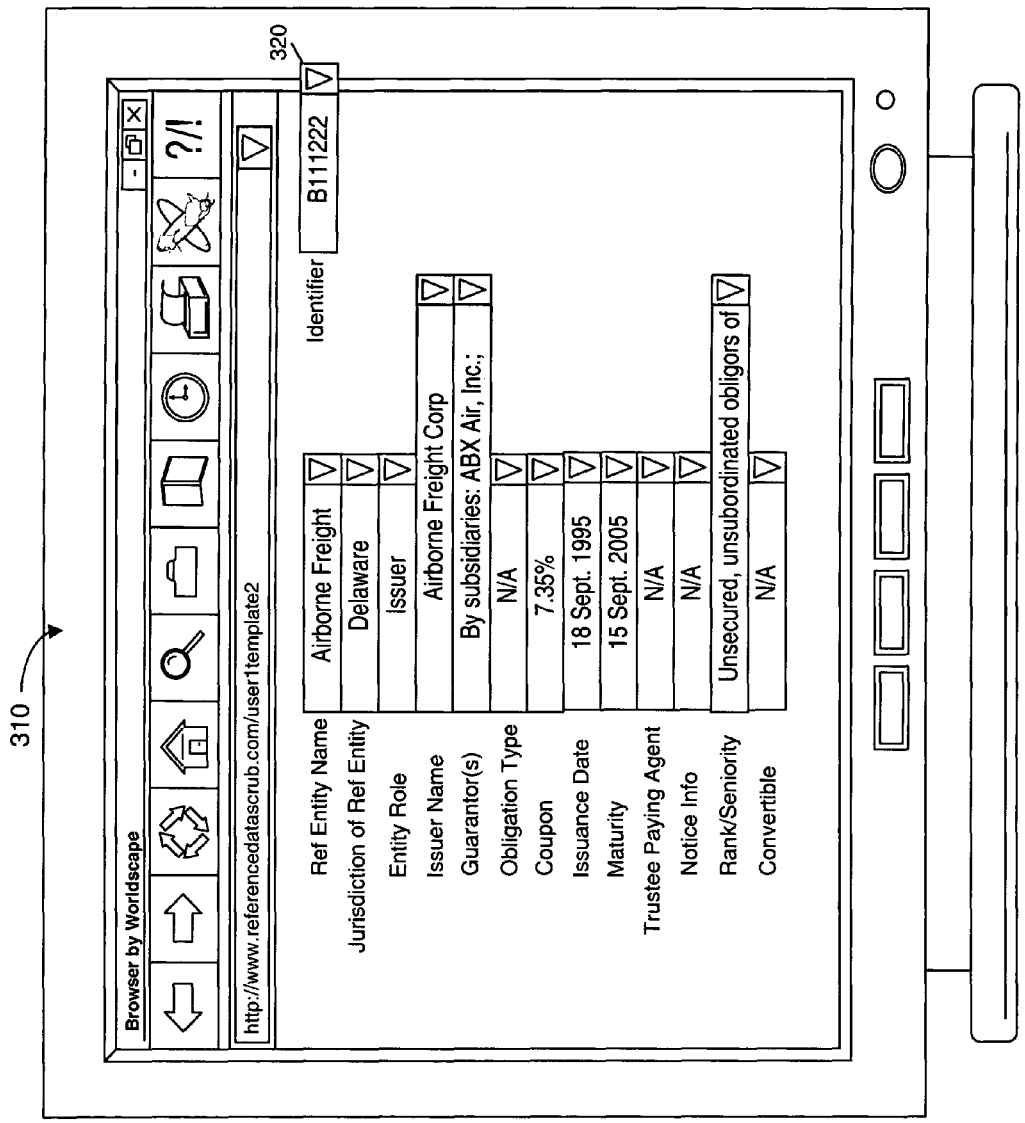
FIG. 4 is an exemplary user interface for entering and viewing reference entity and reference obligation data.

Once the information has been entered as a new database record, the data associated with each schedule is parsed and distributed to one or more users assigned responsibility to particular portions of each schedule. For example, in some embodiments, a team of users may be assigned different responsibilities in performing processing at 202. In some embodiments, parsing and distribution of the schedule may include attaching obligation document(s) associated with relevant reference obligations that are assigned to particular users. In some embodiments, parsing and distribution of the schedule may also include distributing one or more "scrub template(s)" for use by the team of users in performing the scrub at 202. Applicants have found that the use of standardized templates promotes uniformity and accuracy in the process, allowing users to be prompted to provide specific information that can be used to ensure the accuracy of information in the database. An example of a sample scrub template 320 is depicted at FIG. 4. As depicted at FIG. 4, scrub template 320 is displayed on a display monitor of a sample user device 310. In some embodiments, scrub templates may be distributed to users for data entry via electronic forms.

In the example scrub template 320 of FIG. 4, a number of fields of information associated with a particular reference entity and a particular reference obligation are solicited. Scrub template 320 prompts entry from a user for the following items of information: a reference entity name; a jurisdiction of reference entity; an entity role; an issuer name; a guarantor(s); an obligation type; a coupon; an issuance date; a maturity; obligation identifier (e.g., such as a CUSIP (Committee on Uniform Security Procedures), ISIN (International Securities Identifying Number), or other identifier); issuance currency; rank/seniority; and convertible. Those skilled in the art will appreciate that other information may also be solicited, depending on the nature of the obligation and entity. For example, in some embodiments, information regarding the trustee/paying agent (including an identification of the agent and notice information associated therewith) may also be provided. Pursuant to some embodiments, a user who is asked to provide this information may provide the information based on current documents (e.g., such as current obligation documents relating to each reference obligation). A discussion of each of the entries in the exemplary scrub template 320 follows.

Data identifying the name of a particular reference entity is entered in the "Reference Entity Name" field of template 320. In one embodiment, this information is retrieved from, for example, a schedule provided by a party wishing to enter into a derivative transaction associated with an obligation of the reference entity. In some embodiments, the data entered into template 320 is the name of this entity, precisely as found in the client's schedule and without modification. In some embodiments, the data is electronically pulled from the schedule to populate the Reference Name Entity field of template 320.

In some embodiments, data entered in each of the fields is provided in a specified format to ensure consistency and accuracy. For example, in some embodiments, particular data conventions may be implemented to provide further consistency in the system. In particular, a format may be specified which may include punctuation, abbreviation, and naming conventions. As a specific and illustrative example, the following punctuation, abbreviation and naming conventions may be utilized to promote consistency: (1) ignore periods at the end of a name (e.g., "Arrow, Inc." should be "Arrow, Inc"); (2) include periods in the main part of a name (e.g., "B.A.T. Industries, Inc"); (3) utilize standardized abbreviations (such as Ltd, Plc, NV, AB, SpA, AG, BA, BV); (4) do not utilize naming abbreviations unless used in the offering documents (e.g., do not utilize "Co" for "Company", "Grp" for "Group", or "Corp" for "Corporation" unless the offering document utilizes the abbreviation); (5) when the entity name begins with "The", move it to the end of the name in parentheses (e.g., "Gap Inc (The)" rather than "The Gap Inc"); (6) utilize lower case rather than all caps even if all caps are used in the offering documents (e.g., "British Energy Plc" rather than "BRITISH ENERGY Plc"); (7) utilize accents on names; and ""(8) if the offering document has "(publ)" as part of the name, this must be included in the reference entity name;.""

These example conventions are provided for illustration only. Other conventions may be used, to encourage consistency in data entry and naming. Other conventions may be used. An example, for Chinese and Japanese names, the legal English translation may be used, unless the name has a mix of English and foreign characters (e.g., use "Takefuji Corporation (Takefuji Kabushikigaisha)"). In some embodiments, computer code and/or rules based software may be used to enforce the conventions as data is entered.

Referring again to template 320 of FIG. 4, data identifying the legal jurisdiction associated with the reference entity is entered in the "Jurisdiction of Reference Entity" field of template 320. This information may be retrieved from offering documents associated with a particular offering. Offering documents will usually indicate the jurisdiction of the reference entity. For example, the jurisdiction of the reference entity may be indicated in the section of the offering documents titled "Description of the Issuer." The data entered into the "Jurisdiction of Reference Entity" field of template 320 is preferably explicit jurisdiction information. By way of example, "IBM is a Delaware corporation," is an explicit indication of jurisdiction. The address of the head office of the corporation, however, is not. If no explicit indication of the jurisdiction is found, then information regarding the address of the corporation or any other facts helpful in determining the corporation's jurisdiction should be noted with qualification. If available, corporate registry numbers, the site of corporate registration or filing, and all references to jurisdictional subsets (states, cantons, municipalities, etc.) should be noted.

In some situations, no jurisdiction information may be identified from the offering documents. In such situations, a user may perform a search (manual, electronic or both) to search for the information in other documents that have been incorporated by reference into the provided offering document. In offering documents which are subject to U.S. Securities and Exchange Commission (SEC) regulations, a list of documents that are incorporated by reference can usually be found in the section entitled "Where You Can Find More Information". For U.S. reference entities, if any of the documents listed were filed after 1992, they may be available on the SEC's website in the EDGAR filing archives.

In some embodiments, jurisdiction information may be assumed and the jurisdiction field may be automatically populated. For example, jurisdiction may often be assumed in sovereign debt situations (where the reference entity is a country). The jurisdiction of the reference entity "Republic of Colombia", for instance, is likely Colombia and nothing has to be done in the way of requesting documents to establish this. A user should exercise discretion and care before allowing jurisdiction to be assumed. The reference entity "Bank of Greece", for instance, may or may not be administered by a sovereign. In such a situation, the user may further read the obligation documents to determine whether the reference entity is a governmental instrumentality or a private institution.

Data identifying the role of the entity identified in the Reference Entity Name field of template 320 is entered in the "Entity Role" field. The reference entity may be either the issuer or the guarantor of the obligation. Once the reference entity is entered into the first line of the scrub template, a user identifies the reference entity's role in the offering by, for example, reviewing the offering materials. Once determined, the user notes either "issuer" or "guarantor" as applicable.

Data identifying the name of the issuer and guarantor are entered in the "Issuer Name and Guarantor Name" field of template 320. For example, the user may enter data indicating the name of the issuer and guarantor of the obligation, precisely as they appear in the obligation documents. As described above, in some embodiments, naming, punctuation, and abbreviation conventions may be utilized to further ensure that data entered into the template is accurately and consistently entered. In embodiments which utilize such conventions, the data entered into template 320 should be entered pursuant to those conventions. In some embodiments, code associated with scrub template 320 may enforce such conventions (e.g., if a name is entered which fails to comply with the conventions, an error message may be displayed or a suggested data change may be displayed for the user's authorization). Similar conventions and checks of conventions may be utilized to ensure that other data entered into template 320 is entered in a consistent and accurate manner.

Data identifying the interest rate of the obligation is set forth in the "Coupon" field of template 320. Note that in an offering including several tranches, the coupon, maturity, status, etc., of the relevant tranche should be traced through the document and reported on the template. In some embodiments, the template may also allow the entry of other financial information associated with an obligation. For example, if the obligation is a "step up" bond, information may be provided which specifies the steps of the bond and the step up dates, etc. Obligations with a floating rate of interest may simply be indicated by an abbreviation (such as, for example, "FRN") and the details or calculation of the floating interest rate need not be noted.

Data identifying the date of issuance of the obligation are set forth in the "Issuance Date" field of template 320. This date is explicitly indicated in a pricing supplement. In the event that the obligation is a stand-alone issue, the "expected delivery date" is the issuance date. The expected delivery date of the notes generally appears on the cover of the offering circular or prospectus and is usually preceded by the words "on or about." In the event that a delivery date is not provided, enter the date of the prospectus itself, indicating on the template that this is not an explicit issuance date. The date of the prospectus is only roughly accurate to within a week or so of the issuance date.

Data identifying the maturity date of the obligation is set forth in the "Maturity" field of template 320. Note that in an offering that includes several tranches, the coupon, maturity, status, etc., of the relevant tranche must be traced through the document and reported on the template.

Other fields may also be provided. For example, if tracked, data identifying the trustee or paying agent may be set forth in the "Trustee/Paying Agent" field of template 320. In a particular obligation, there will either be a Trustee or a Fiscal Agent. In other words, where a Fiscal Agent is identified, there will likely be no Trustee. In the event that there is a Trustee, there will likely be a Paying Agent. In certain circumstances, however, where the obligations are to be placed with a depositary (e.g., DTC), the issuer will elect not to name a Paying Agent and will make payments either directly or through the Trustee to the depositary (to be distributed by the depositary to the individual investors). In such instances, the Paying Agent should be listed as "n/a (issuer/trustee). In the event that there is a Fiscal Agent, there may or may not be a Paying Agent (as the Fiscal Agent sometimes assumes the responsibilities of a Paying Agent). Note also that there may be multiple Paying Agents, although one of these will usually be indicated as the Principal Paying Agent.

In some embodiments, specific information regarding the Trustee, Fiscal Agent and Paying Agent (as relevant) may be required to be entered into template 320. The data entered should be the exact name of the relevant institutions, although their addresses may not be required. If there are multiple institutions assuming any of these roles, it will be necessary to include all of them. Note, however, that in the event that multiple Paying Agents are listed, only information regarding the Principal Paying Agent is required. Data identifying a ranking of a particular obligation are set forth in the "Rank/Seniority" field of template 320. In most cases, this field will include data identifying whether the notes are "subordinated" or "unsubordinated." The variations and complexities associated with each of these categories are discussed below.

When the reference entity is an issuer, data provided in the Rank/Seniority field includes data used to determine the status of the notes issued. When the reference entity is a guarantor, data provided in the Rank/Seniority field includes data used to determine the status of the guarantee and not the issuance. Also, the guarantee must be irrevocable and unconditional. Otherwise, the actual status of the issuance must be determined by reference to appropriate legal texts. (The discussion below is relevant to both the status of notes and guarantees, although for ease of explanation, we refer only to the status of notes.)

Subordinated notes are either contractually subordinated or structurally subordinated. In particular, for the purposes of scrubbing data, a determination should be made whether a note is contractually subordinated, which will likely be indicated explicitly in the obligation documents. For example, obligation documents may indicate that "Subordinated Notes Due 2007", in which case template 320 should be updated to indicate "subordinated" under the Rank/Seniority heading. Further, for example, information could also be provided regarding the contractual subordination (if any).

Usually, a prospectus will explicitly indicate the status as that of unsubordinated notes (with language like "the notes are senior, unsecured, unsubordinated obligations of the company ranking pari passu . . . "). This explicit indication of unsubordinated status is obviously preferred. On occasion, however, the obligation documents will indicate that the notes are "senior" without indicating that they are "unsubordinated." Senior notes are generally unsubordinated. It is, however, possible (if rare) for senior notes to be subordinate to other obligations. If the documents indicate that the notes are senior, but they do not use the word "unsubordinated" alongside, a user should read them carefully to determine if there is any possibility that such a "mezzanine" type structure is involved.

Sovereign debt—or debt issued by a government or a state—presents a unique situation in that regardless of what is indicated in the obligation documents with respect to status, policy (as opposed to contract) often determines the outcome. If the obligation documents relate to sovereign debt, a user should be instructed to apply the analysis above, then indicate on the relevant part of template 320 that the obligation is issued or guaranteed by a sovereign ("Subordinated—Sovereign" or "Unsubordinated—Sovereign").

Referring again to the different fields of template 320, data indicating whether a particular obligation is convertible is entered into the field "Convertible" of template 320. In some embodiments, only reference obligations that are convertible or exchangeable into another security or obligation should be noted as being convertible. If the prospectus does not mention convertibility, it can generally be assumed that the issuance is not convertible.

Other data may also be provided by users. For example, template 320 (or other input screens) may prompt a user to enter information about the particular offering documents which have been provided, as well as the date of such documents. For example, if only the pricing supplement had been received, then this would be noted, allowing later users (e.g., users who create "needs lists") to easily determine which documents are required. Note that sometimes there will only be a prospectus, whereas other obligations will also have a prospectus supplement or a pricing supplement, or both. Therefore, a user should indicate when all of the relevant documentation has been received to avoid giving the impression that additional documents should be requested.

Users may also be prompted to indicate the language of the obligation documents. This will usually be English, but indicating the language allows easier determination of what/when translators will be required. In some embodiments, the parsing and distribution of the schedule may also include identifying a particular user who has particular expertise and forwarding information to that user accordingly. For example, in some embodiments, some obligation documents may be in a language other than English. Accordingly, processing may include identifying a qualified user who is fluent in the language of the obligation document and forwarding the document, relevant portions of the schedule, and one or more scrub templates to that user.

Users may also be prompted to indicate the most recent confirmation date, or the date that appears on the official jurisdictional document as the date on which it was certified by the relevant authority. The date on which the official jurisdictional document was certified is the "record date" or the last date on which the information was certified as being accurate. In some embodiments, information associated with reference entities may be entered using a separate template or user interface (not shown), configured to receive reference entity data. In some embodiments, entry of reference entity data is performed below at 204 (it is discussed here for convenience).

Processing at 202 includes verifying whether all of the obligation documents provided for a particular reference obligation furnish sufficient information to fill out template 320. If sufficient information is provided in the obligation documents, and if the information entered into the template coincides with every item on the schedule provided for the reference obligation, then processing at 202 is complete. However, frequently, insufficient data is provided in the obligation documents to complete template 320. Further, in some situations the data in template 320 does not coincide with the data provided in the schedule. In such cases, processing continues to identify missing documents that are needed to properly complete the template and to identify whether the schedule provided was accurate. The types of obligation documents that may be required to properly complete step 202 may vary based on the type of obligations being examined. For example, if the obligation is a stand-alone offering (e.g., a one-time offering involving a single issuance of notes or bonds, potentially in tranches), obligation documents will include: (1) a prospectus or offering circular; and (2) any prospectus or offering circular supplements that have been issued. If the obligation is a "programme", an issuer may issue an issuer several different times and, indeed, several different types of securities, so long as the maximum amount of the programme is not exceeded and the programme documentation allows. The obligation in question may be pursuant to a programme or a shelf registration. The offering circular to a programme will usually explicitly indicate this on the cover. Obligation documents include: (i) the prospectus or offering circular, (ii) any supplements to these documents and (iii) a pricing supplement or term sheet that confirms, among other things, the date and amount of the issuance. Thus, continued processing at 202 may include identifying the type of offering to determine the type of obligation documents that may be missing.

Processing continues where a determination is made to identify which documents are missing. Applicants have found that problems arise in four general areas:

(1) In some transactions, no documents for a particular reference obligation listed on the schedule are provided. Note, however, that for a recurring reference entity and its associated obligation—that is, for a reference entity and reference obligation that have been previously scrubbed using techniques described herein, or that have been entered into the database—the client need not submit documents as these may have been previously submitted (e.g., accessible to the reference data system or to the user).

(2) In some transactions, only partial documents for a particular reference obligation listed on the schedule are received. Thus, if only a prospectus supplement is received for a reference obligation, the prospectus must be requested as well. Or, if only a prospectus is received for an obligation that is a programme, then the pricing supplement or term sheet must be requested as well.

(3) In some transactions, documents that are not relevant for a particular reference obligation are received. It is possible that the obligation documents received may not correspond with the reference obligation detailed in the schedule. For example, the schedule may indicate that Railtrack Plc issued notes with a 5.0% coupon and a maturity date of Oct. 15, 2007, but the document received is a Railtrack Plc prospectus for a 1.25% issuance, due Jan. 20, 2028.

(4) Alternatively, in the situation above, it is possible that the documents received are for the obligation that a client wishes to have scrubbed, but the schedule is inaccurate. In this case, upon notification, the user preliminarily modifies the schedule in collaboration with the client and proceeds with the documents received. Importantly, however, this modification does not constitute a confirmation of the reference entity and this should be clearly indicated on the schedule.

Once missing documents have been identified, a user may note any missing documents in template 320. For example, the user may note: (i) inconsistencies between the schedule and the documents, (ii) those documents that are missing for each reference obligation, as described above, and (iii) any areas of uncertainty or issues requiring clarification. In some embodiments, the user may also generate a "needs list" detailing the documents and information that must be collected to complete the scrub. In some embodiments, template 320 may be configured to ensure that particular documents or information are identified. For example, template 320 may be configured to reject (or generate an error message or notification) a set of data which does not include all information needed to scrub a reference entity/reference obligation pair.

In some embodiments, users may exchange their completed templates 320 with other users to provide a cross-check of completeness, consistency and accuracy. In some embodiments, this cross-check may require that each user consult the obligation documents in addition to reviewing the completed templates. In some embodiments, a further review is performed by a user having managing authority over other users. In some embodiments, this further review generates a "final needs list" identifying final documents or information needed to complete the scrub. In some embodiments, documents needed to complete the scrub may be retrieved electronically by reference data system 106. In some embodiments, reference data system 106 may generate reminders addressed to particular users to provide the missing information. Once this final needs list is satisfied, processing at 202 is complete and the "scrubbed" reference obligation data is submitted to reference data system 106 for storage and indexing in reference data database 108.

Once scrubbed reference obligation data is submitted to reference data system 106, processing continues at 204 (FIG. 3) where system 100 is operated to scrub reference entity data. Processing at 204 includes identifying one or more users who have been assigned jurisdictional review responsibilities. Users having jurisdictional review responsibilities for a particular jurisdiction associated with a particular reference entity are identified (e.g., the jurisdiction data entered at 202 above is retrieved to identify the relevant jurisdiction). The user responsible for a particular jurisdiction is notified of the need to scrub data associated with a particular reference entity. The user then, either electronically or by other means, acts to secure official documents that establish the continued existence and status of reference entities in his jurisdiction. For example, referring to the system of FIG. 2, reference data system 106 may submit requests for information, or directly retrieve information, from one or more data sources 114.

A number of types of information may be retrieved or requested. For example, jurisdiction information requested may include, for example:

(1) Evidence that the company is still in existence (and the equivalent of a "good standing" certificate where applicable).

(2) Tracking from the date of the issuance to current, evidence of all name changes that have occurred with respect to the reference entity. Whether that information is contained in a single document, or will require a review of multiple filed documents for each given reference entity appears to vary from jurisdiction to jurisdiction. Where multiple obligations of a single reference entity are being reviewed, the issuance date of the earliest obligation is used.

(3) In the event a change of name occurred during the relevant period, track the history of the newly-named company to current.

(4) In some cases, ask the jurisdictional contact (i.e., local counsel) to directly contact the specific companies to confirm or clarify certain pieces of information.

The user responsible for a particular jurisdiction may submit requests or templates to local counsel or contacts in each jurisdiction in an attempt to retrieve the needed documents. Once these documents are retrieved, the user responsible for the jurisdiction may be further responsible for updating reference entity data in the reference data database. In this manner, accurate information regarding reference entities may be established. In some embodiments, the receipt of updated information may trigger other data changes.

Processing continues at 206 where the scrubbed reference entity and reference obligation data is provided to update reference data database 108. Once in the database, this data is used to support the execution of, for example, credit derivative agreements involving the reference entity and reference obligations. (Step 208). Further, once in the database, this information may be used to support other credit agreements involving the reference entity and/or the reference obligations. Each of the steps 202, 204 and 206, pursuant to some embodiments of the present invention, may be repeated to continually update information stored in reference database 108. In this manner, credit agreements using the information of reference database 108 can have a greater level of assurance regarding the accuracy and quality of data. For example, changes in reference entities and reference obligations can be identified and credit derivative agreements updated or drafted appropriately to ensure that obligations are not unintentionally modified.

Figure 5:
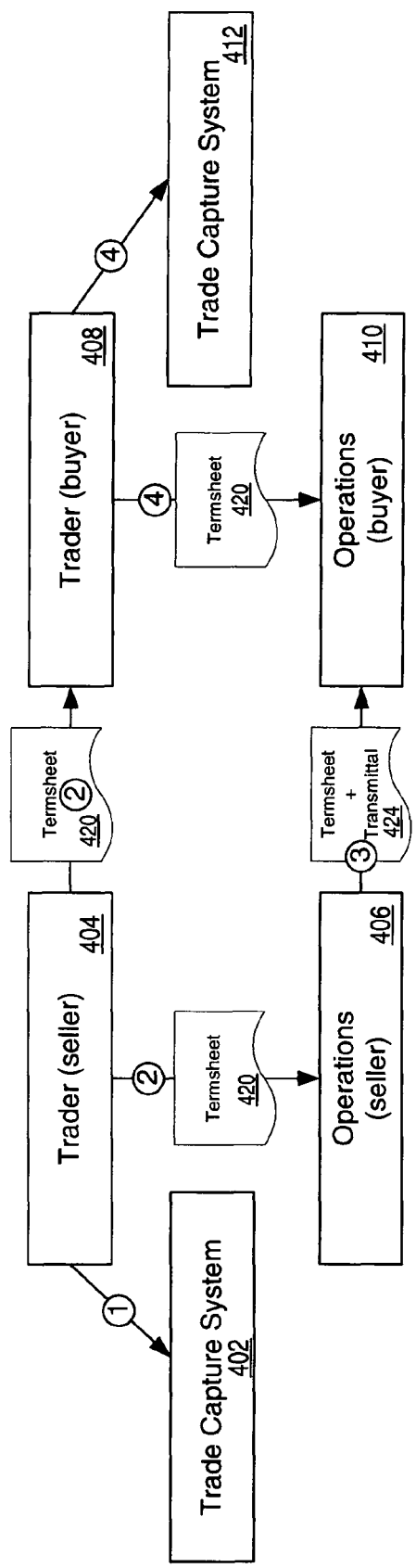
FIG. 5 is a block diagram of a further exemplary support system pursuant to some embodiments of the present invention.
Figure 6:
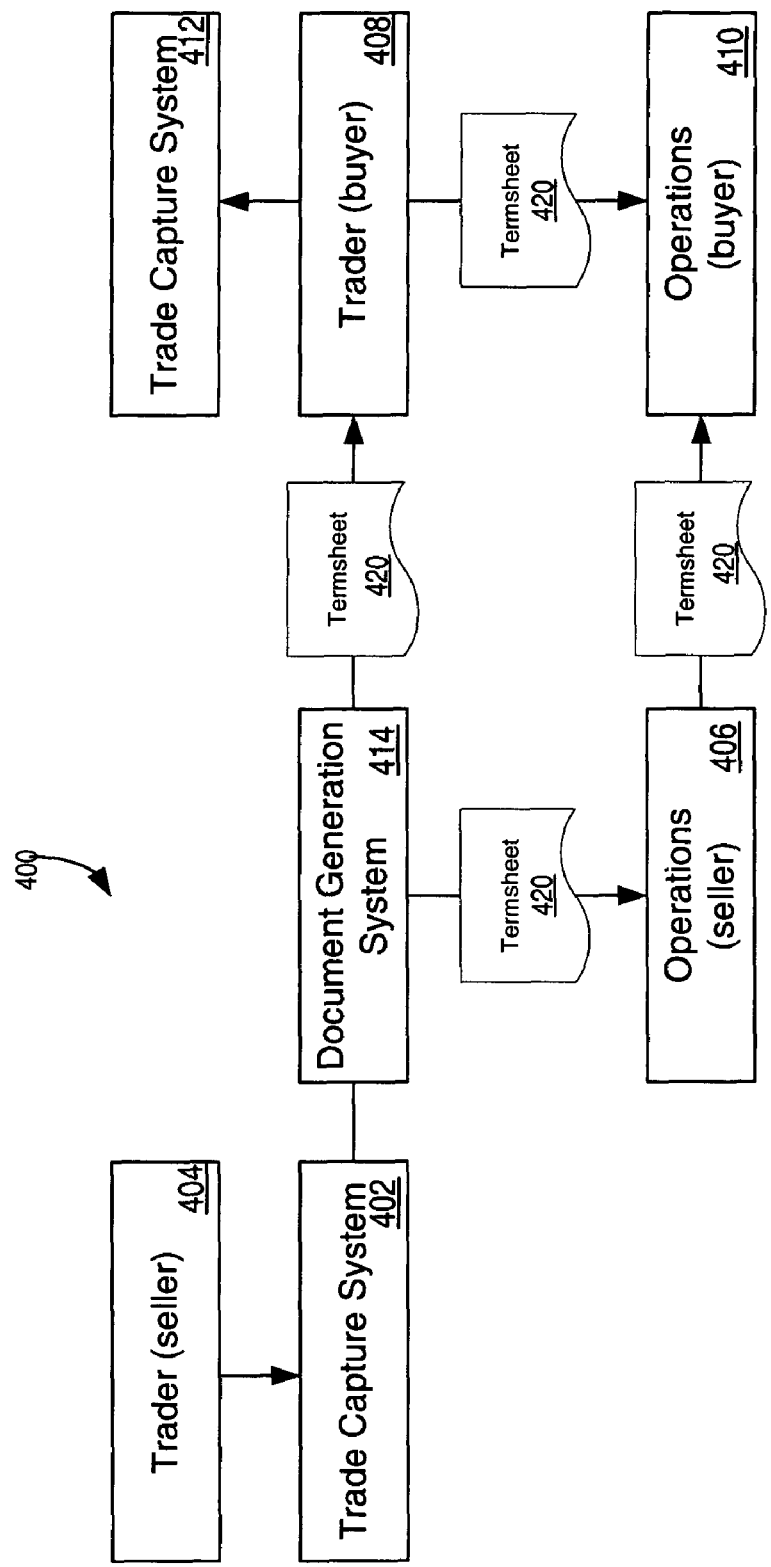
FIG. 6 is a block diagram of a further exemplary support system pursuant to some embodiments of the present invention.
Figure 7:
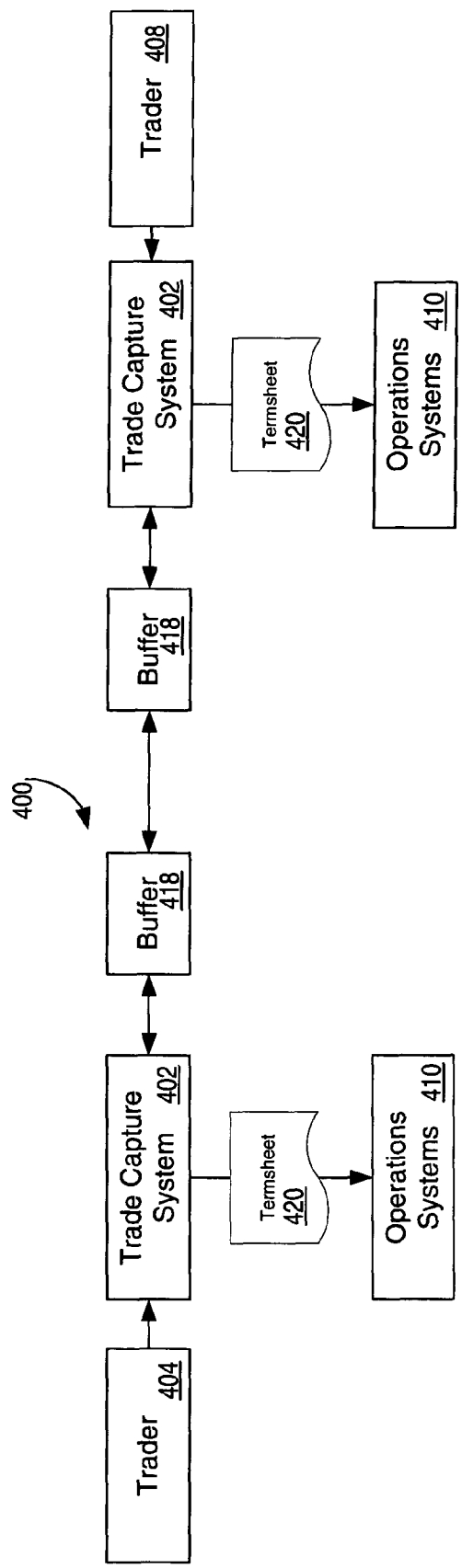
FIG. 7 is a block diagram of a further exemplary support system pursuant to some embodiments of the present invention.

Referring now to FIGS. 5-7, several trading systems 400 are shown which can be used in conjunction with the reference data system described in conjunction with FIG. 2 above. As depicted, each of the trading systems 400 include traders 404, 408 (e.g., such as a buyer and a seller operating trading devices or user devices), trade capture systems 402, 412 (e.g., such as trading systems commonly used in the credit derivatives industry), and operations devices 406, 410 (e.g., such as operations systems commonly used by trading entities which trade credit derivatives). In the depicted systems, a number of termsheets 420 are depicted as being communicated between devices. In existing trading systems, the buyer's operations are required to reconcile the trade data with a confirmation received from the seller's operations group. Because the buyer is not able to comfortably delegate the review of an incoming confirmation to the buyer operations group, the buyer becomes a major bottleneck in the trading system.

Accordingly, Applicants have discovered that this bottleneck can be removed and that other desirable characteristics can be obtained through the use of the trading systems depicted in FIGS. 5-7. In the system of FIG. 5, the buyers operations group is confirming that the confirmation is the same physical document as received by the seller's operations group and as generated by the trade capture system. Further, the confirmation may be generated as an electronic document based on information verified as described in conjunction with FIGS. 2-4 above. In the system of FIG. 6, the use of a trade capture system and document generation system allows for quick system fixes to be implemented to address data quality issues. In the system of FIG. 7, a framework for an industry-wide electronic matching process is provided. Each of the systems removes the bottleneck associated with existing systems and allows the use of "scrubbed" data to be easily injected into the trading system.

Although the present invention has been described with respect to a preferred embodiment thereof, those skilled in the art will note that various substitutions may be made to those embodiments described herein without departing from the spirit and scope of the present invention.

What is claimed is:

1. A system to support a derivative transaction, comprising:
a memory;
a processor disposed in communication with said memory, and configured to issue a plurality of processing instructions stored in the memory, wherein the processor issues instructions to:
  receive data identifying a reference entity participating in said derivative transaction;
  provide a reference entity information template for screening said received data identifying said reference entity;
  screen said received data according to the provided reference entity information template identifying said reference entity for accuracy;
  receive data identifying at least a first reference obligation associated with said derivative transaction;
  provide a reference obligation information template for screening said received data identifying said at least a first reference obligation;
  identify and provide one or more supporting electronic documents for screening said received data identifying said reference entity and said at least a first reference obligation;
  screen said received data according to the provided reference obligation information template identifying said at least a first reference obligation for accuracy by comparing said received data with information in said one or more supporting electronic documents;
  identify a contractual relationship between said reference entity and said at least first reference obligation;
  output a data record associated with said derivative transaction, said data record including said data identifying said reference entity, said data identifying said at least first reference obligation, and data identifying said contractual relationship, wherein said data record is verified as accurate as of an issue date of said derivative transaction; and
  using said outputted data record associated with said derivative transaction to execute a derivative agreement involving said reference entity and said at least a first reference obligation.

2. The system of claim 1, further comprising:
verifying, on a periodic basis, the legal existence and good standing of said reference entity.

3. The system of claim 2, further comprising:
determining, based on said verifying, whether a status of said reference entity has changed; and
updating said initial record if said status has changed.

4. A processor-readable medium storing a plurality of processing instructions, comprising issuable instructions by a processor to:
receive data by a processor identifying a reference entity participating in said derivative transaction;
provide a reference entity information template for screening said received data identifying said reference entity;
screen said received data according to the provided reference entity information template identifying said reference entity for accuracy;
receive data identifying at least a first reference obligation associated with said derivative transaction;
provide a reference obligation information template for screening said received data identifying said at least a first reference obligation;
identify and provide one or more supporting electronic documents for screening said received data identifying said reference entity and said at least a first reference obligation;
screen said received data according to the provided reference obligation information template identifying said at least a first reference obligation for accuracy by comparing said received data with information in said one or more supporting electronic documents;
identify a contractual relationship between said reference entity and said at least first reference obligation;
output a data record associated with said derivative transaction, said data record including said data identifying said reference entity, said data identifying said at least first reference obligation, and data identifying said contractual relationship, wherein said data record is verified as accurate as of an issue date of said derivative transaction; and use said outputted data record associated with said derivative transaction to execute a derivative agreement involving said reference entity and said at least a first reference obligation.

5. The medium of claim 4, further comprising issuable instructions by a processor to:
enforce conventions to provide consistent data entry associated with said data identifying a reference entity.

6. The medium of claim 4, further comprising issuable instructions by a processor to:
enforce conventions to provide consistent data entry associated with said data identifying a reference obligation.

7. A processor-implemented method for supporting a derivative transaction, comprising:
receiving by a processor data identifying a reference entity participating in said derivative transaction;
providing a reference entity information template for screening said received data identifying said reference entity;
screening said received data according to the provided reference entity information template identifying said reference entity for accuracy;
receiving data identifying at least a first reference obligation associated with said derivative transaction;
providing a reference obligation information template for screening said received data identifying said at least a first reference obligation;
identifying and providing one or more supporting electronic documents for screening said received data identifying said reference entity and said at least a first reference obligation;
screening said received data according to the provided reference obligation information template identifying said at least a first reference obligation for accuracy by comparing said received data with information in said one or more supporting electronic documents;
identifying a contractual relationship between said reference entity and said at least first reference obligation;
outputting a data record associated with said derivative transaction, said data record including said data identifying said reference entity, said data identifying said at least first reference obligation, and data identifying said contractual relationship, wherein said data record is verified as accurate as of an issue date of said derivative transaction; and
using said outputted data record associated with said derivative transaction to execute a derivative agreement involving said reference entity and said at least a first reference obligation.

8. The method of claim 7, further comprising:
verifying, on a periodic basis, the legal existence and good standing of said reference entity.

9. The method of claim 8, further comprising:
determining, based on said verifying, whether said reference entity has assumed additional liabilities.

10. The method of claim 8, further comprising:
determining, based on said verifying, whether said reference entity has been released from obligations.

11. The method of claim 8, further comprising:
determining, based on said verifying, whether a status of said reference entity has changed; and
updating said initial record if said status has changed.

12. The method of claim 11, wherein said status includes: a name change, a merger, and a de-merger.

13. A processor-implemented method for supporting a derivative transaction, comprising:
receiving by a processor a request to screen information associated with an agreement for a derivative transaction, said information including reference obligation information and reference entity information;
identifying by the processor, in response to the request, one or more associated electronic documents for screening said received reference entity and reference obligation information;
providing the identified one or more associated electronic documents for screening said received reference entity and reference obligation information;
providing, in response to the request, a reference entity information template for entering reference entity information and a reference obligation information template for entering reference obligation information;
receiving reference entity and reference obligation information entered via the provided templates;
screening said received reference entity and reference obligation information to verify accuracy of the received information by matching the received reference entity and reference obligation information with information from said one or more associated electronic documents;
generating a data record associated with said reference obligation, said data record including said screened reference entity and reference obligation information; and
facilitating execution of a derivative agreement involving said reference entity and reference obligation using said generated data record.

* * * * *